United States Patent [19]

Iverson et al.

[11] Patent Number: 4,558,782

[45] Date of Patent: Dec. 17, 1985

[54] POINT OF SALES PACKAGE FOR CASSETTE TAPE CARTRIDGES

[75] Inventors: Peter B. Iverson, Plymouth; John A. Gambell, Burnsville, both of Minn.

[73] Assignee: Imperial Plastics, Inc., Lakeville, Minn.

[21] Appl. No.: 464,468

[22] Filed: Feb. 7, 1983

[51] Int. Cl.[4] ............................................. B65D 85/672
[52] U.S. Cl. ...................................... 206/387; 220/74; 220/23.8; 220/359
[58] Field of Search .................. 206/387; 200/72, 74, 200/23.8, 359

[56] References Cited

U.S. PATENT DOCUMENTS

| | | | |
|---|---|---|---|
| 3,268,144 | 8/1966 | Gaunt | 220/74 |
| 3,386,608 | 6/1968 | Diller | 220/23.8 |
| 3,451,588 | 6/1969 | Weber | 220/74 |
| 3,463,309 | 8/1969 | Szostek | 206/470 |
| 3,547,305 | 12/1970 | Khovry | 220/359 |
| 3,640,379 | 2/1972 | Weingarden | 206/387 |
| 3,647,104 | 3/1972 | Goings | 220/23.8 |
| 3,871,516 | 3/1975 | Holkestad et al. | 200/387 |
| 3,896,929 | 7/1975 | Mills | 206/387 |
| 4,215,782 | 8/1980 | Festag et al. | 220/359 |
| 4,245,741 | 1/1981 | Holkestad | 206/387 |
| 4,381,836 | 5/1983 | Rivkin et al. | 206/387 |

FOREIGN PATENT DOCUMENTS 2837610  3/1980  Fed. Rep. of Germany ...... 206/387

Primary Examiner—Joseph Man-Fu Moy
Attorney, Agent, or Firm—Merchant, Gould, Smith, Edell, Welter & Schmidt

[57] ABSTRACT

A point of sales package (10) for a cassette tape cartridge (20) is disclosed. The package includes a base (12) having at least two recessed cavities (16a and 16b), at least one of the cavities designed for receiving and storing a cassette tape cartridge (20). The package further includes a cover (14) designed for sealing attachment with the base (12), and means for releasably mating the cover to the base to form a sealed package, for example, with an adhesive. Further included is a means for providing the package (10) with added resistance to bending. This means includes a recessed bridge area (22) extending between and connecting at least two of the recessed cavities (16a and 16b), and can further include a recessed channel (24) surrounding the periphery of the base (12). The package (10) can be inexpensively thermoformed from a single sheet of thin flexible plastic.

1 Claim, 5 Drawing Figures

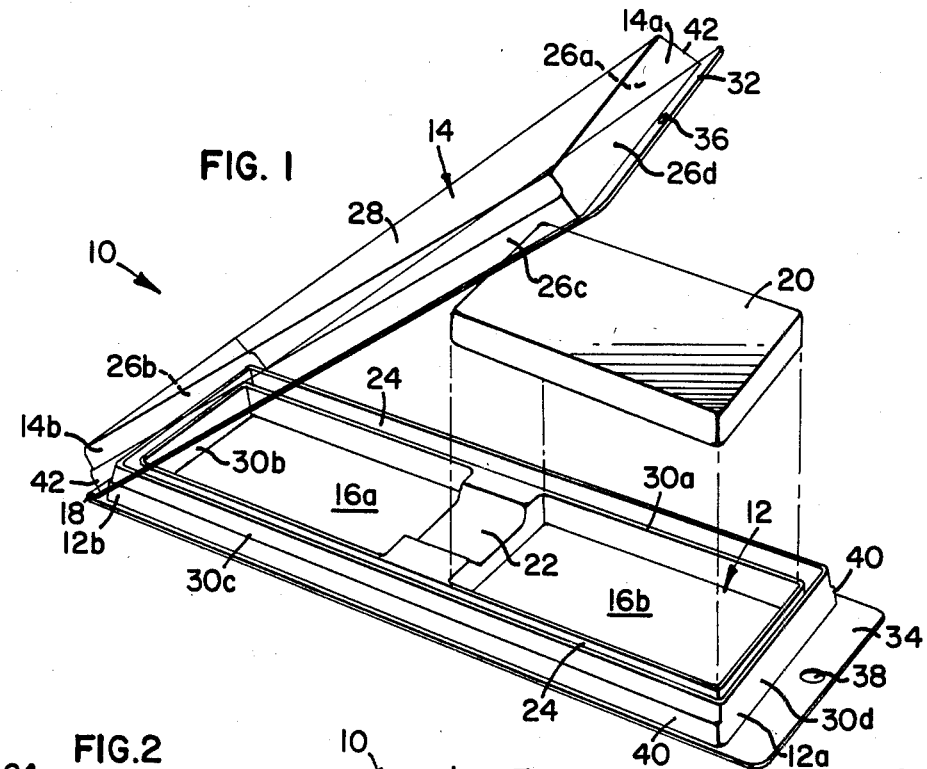
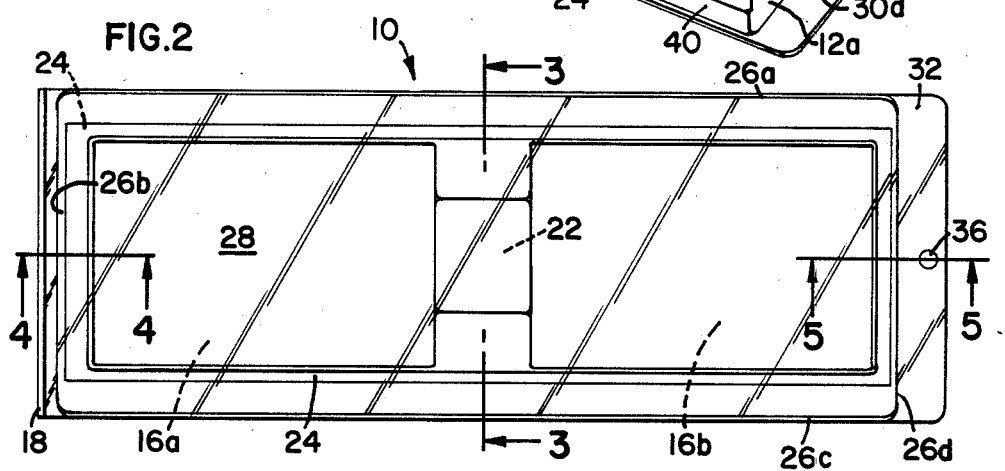
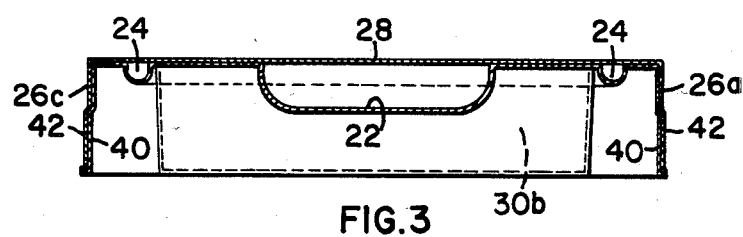

4,558,782

POINT OF SALES PACKAGE FOR CASSETTE TAPE CARTRIDGES

TECHNICAL FIELD

The invention of the present application relates generally to the field of point of sales packages. More particularly, this invention relates to a point of sales package for cassette tape cartridges.

BACKGROUND OF THE INVENTION

A variety of point of sales packages for cassette tape cartridges, also referred to as "cassettes", "tapes", "tape cartridges", and so on are known in the art. Typically, a cassette tape cartridge is sold in a small rigid plastic box which conforms substantially to the size and shape of the cartridge. This small rigid plastic box is commonly referred to as a "Norelco" box. Other types of packaging conforming substantially to the size and shape of the cartridge have also been used as a point of sales package, either in addition to the "Norelco" box or alone. Due to the small size of a cartridge, typically about 4"×2-½"×½", "Norelco" boxes and other packaging arrangements which conform substantially to the size and shape of a cartridge allow the tapes to be easily stolen since they can be readily and unobtrusively slipped into a pocket or purse. In fact, shoplifting or theft of cassette tape cartridges from the point of sales has been a significant problem for cassette tape retailers.

Various attempts have been made to alter the packaging of casette tape cartridges to make theft of the tapes more difficult.

One solution to the theft problem has been to mount a tape cartridge on a larger cardboard backing of a size difficult to slip into a pocket or purse. However, it became apparent that shoplifters were merely folding the cardboard over to create a smaller and more easily stolen package.

Another solution to the theft problem has been to package the tapes in a larger box made of rigid injection molded plastic. The box is typically of a size too large to easily fit into a pocket or purse. The rigidity of the plastic makes it difficult to fold the package into a smaller size for easy concealment and theft. However, these boxes tend to be prohibitively expensive, due in part to the injection molding process.

Several years ago, in an attempt to provide a theft-resistant package which was less expensive than the injection molded plastic variety, the recording industry introduced a relatively large box made of paperboard. The box was about 12"×4"×¾", designed to hold one "Norelco" box containing a casette tape cartridge. The size of the box made it difficult to steal, and the stiffness of the paperboard made the package somewhat difficult to fold to a smaller size for easier theft. The large amount of surface area was useful for describing and promoting the recording within. However, several drawbacks became apparent with this type of packaging. First, due to their dimensions, the paperboard boxes proved to be too bulky for efficient shipping and warehousing, from the time the box was manufactured until the tape was inserted and offered for sale. Second, the packages were preprinted to correspond to a particular recording. To be sure of having sufficient packaging on hand, it was necessary to order large quantities of preprinted packaging for a single recording. The recording industry typically prefers to order printed insert material which can be seen when viewing the box, rather than printing directly on the package. In this way, any package can be used with any recording; only the insert will vary. The time involved in receiving a reorder for preprinted packaging is substantially greater than the time involved in receiving a reorder of printed inserts. Thus, printed packaging must be ordered in advance to insure its availability when the recording sells, while printed inserts can be ordered in small quantities at frequent intervals, even two or more times per day, to correlate with the rising and falling consumer demand for a particular recording. In this way, the industry is typically free of excess printed matter when a recording's popularity drops off. A major drawback of the preprinted paperboard boxes is the necessity of advance ordering and the resulting inventory which may be wasted when a recording stops selling.

Thus, the recording industry still has need of a theft resistant, inexpensive, easy-to-ship point of sales packaging for cassette tapes. It is to these needs and the above-described deficiencies in the art that the invention in accordance with the present application is directed.

SUMMARY OF THE INVENTION

The present invention is a point of sales package for a cassette tape cartridge. According to this invention there is provided a base having at least two recessed cavities in a generally coplanar relationship. At least one of these cavities is designed for receiving and storing a cassette tape cartridge. Additionally provided is a cover, designed for releasable sealing attachment or releasable mating with the base. Also provided is a means for releasably mating the cover to the base, to form a sealed package. The invention further comprises a means for providing a package with resistance to bending.

The specific advantages of the invention will become apparent with reference to the accompanying Drawings, detailed description of the invention, and claims.

BRIEF DESCRIPTION OF THE DRAWINGS

FIG. 1 is a perspective view from above and to the right of my invention of the point of sales package for a cassette tape cartridge, the package being portrayed in a partially open position.

FIG. 2 is a plan view of my invention shown in FIG. 1, generally viewed as from above, the package being portrayed in the closed position.

FIG. 3 is a cross-sectional view of my invention as shown in FIG. 2, taken generally across line 3—3.

DETAILED DESCRIPTION OF THE INVENTION

Figure 4:
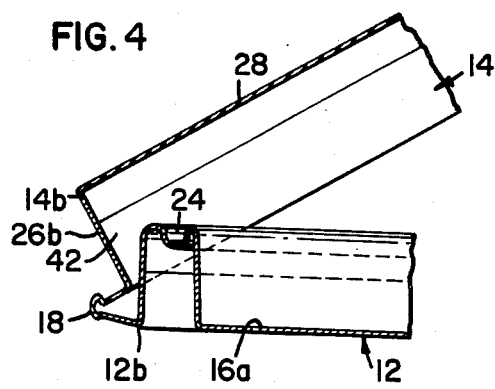
FIG. 4 is a cross-sectional view of my invention, taken generally along line 4—4 of FIG. 2, but with the cover in a partially opened position.
Figure 5:
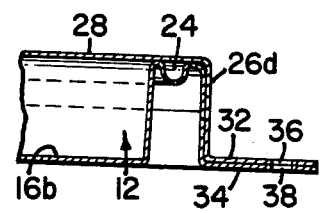
FIG. 5 is a cross-sectional view of my invention shown in FIG. 2, taken generally along line 5—5.

Referring now to the Drawings wherein like reference numerals denote like elements throughout the several views, there is generally designated at 10, a point of sales package for cassette tape cartridges. The package comprises a base 12 and a cover 14. The cover is designed for sealing attachment with the base. Cover 14 comprises a free end 14a, and a hinged end 14b. Cover 14 further includes a top face 28, and outwardly disposed sidewalls 26a, b, c, and d, extending from top face 28. In a preferred embodiment, the sidewalls completely surround the outer edges of top face 28. The sidewalls are preferably disposed at an angle greater than 90°, to provide for the proper mating with the base, as is later described.

Base 12 includes a free end 12a and a hinged end 12b. The base further includes at least two recessed cavities 16a and 16b. At least one of the cavities 16a and 16b are designed for receiving and storing a cassette tape cartridge, typically within a "Norelco" box, as designated at 20. Almost all of the albums recorded onto tape cartridges and offered for sale, are offered as a single cartridge. However, in those atypical cases where a recording uses two cartridges rather than one, it is envisioned that this invention can accomodate such a recording, by providing both recessed cavities of a size and shape to receive and store a cartridge. However, it is understood that if desired, only one cavity can be designed to accomodate a tape cartridge, while the other can be of a different design, for example, smaller. Having two or more cavities provides the package with strength and resistance to bending, regardless of whether each cavity is of a size and shape to hold a cartridge. It is believed that a cavity only half the length of a cartridge would provide sufficient bend resistance, in combination with the other features of this invention, to provide a theft-resistant package.

As seen most clearly in FIG. 1, base 12 also comprises sidewalls 30a, b, c, and d, located along all the sides of the base, surrounding the grouping of cavities 16a and 16b. The sidewalls of the base are designed to be closely embraced and releasably attached to sidewalls 26a, b, c, and d of cover 14, by an adhesive such as a pressure-sensitive adhesive or a solvent-activated adhesive, by heat sealing, by pressure such as a rubber band forcing the cover and base together, or the like.

As seen most clearly in FIG. 4, cover 14 and base 12 can be flexibly connected or hinged to each other at ends 12b, and 14b, forming hinge 18. In the preferred embodiment, cover 14 and base 12 are formed by thermoforming a single sheet of thin flexible plastic, and hinge 18 will then be formed at the same time and will also comprise a portion of the single sheet of thin flexible plastic. It is envisioned that hinge 18 could be made of another material, either the same as or different than the cover or base, either formed as an integral part of the cover or base or separately attached to either or both. The material could be paperboard, aluminum, fabric, plastic, or other flexible material. Alternatively, the hinge could be provided by stitching together ends 12b and 14b, adhesively connecting them, stapling them together, or joining them in any like fashion. It is also envisioned that package 10 can be without a hinge.

Package 10 further comprises means for providing the package with added or increased resistance to bending. As previously discussed, the presence of at least two cavities deters bending of the package and theft of the package and tape cartridge within. Further resistance to bending is offered by a recessed bridge area 22 extending between and connecting at least two of the recessed cavities. Because of the bridge area, the connected cavities are in fluid communication with each other. The presence of bridge area 22 stiffens base 12 to prevent easy bending or doubling over of the package where the hinged ends would be brought toward the free ends creating a smaller, more easily stolen package.

The means for providing increased resistance to bending further comprises a recessed channel or rib 24 which is located around the periphery of the base, thereby stiffening the base. In the preferred embodiment, recessed channel or rib 24 completely surrounds the outside edge of the top surface of the base, as clearly shown in FIG. 1.

It is envisioned that additional channels or ribs similar to channel 24 could be used to further enhance the bend-resistance of the package. It is expected that these channels or ribs would be particularly beneficial if located across the bridge area 22. For example, three channels similar in design to channel 24, either recessed or protruding, of sufficient width to provide further bend resistance to the package, could be provided across the bridge area, parallel to base sidewalls 30a and 30c. One channel or rib could be located across the center of the bridge area, and one could be located to either side of that center channel, such as where the surface of the bridge area begins to turn upward away from the recessed area. However, it is understood that the number or location of the additional channels would not be limited to the above example.

Protruding from base sidewalls 30a and 30c along their length is a ridge or shoulder 40. A corresponding ridge or shoulder 42 is present along the length of cover sidewalls 26a and 26c. The shoulders provide increased rigidity to the package, enhancing its bend- or fold-resistance to discourage its theft. As shown in FIG. 3, shoulders 40 and 42 can be designed to fit closely together for an improved sealing relationship when the cover is closed.

Means are also provided for releasably mating the cover to the base to form a sealed package. In the preferred embodiment, this releasably mating means comprises an adhesive located on at least a portion of either of the cover sidewalls 26a, b, c, and d, and the base sidewalls 30a, b, c, and d. It is envisioned that when the cover is closed, the sidewalls of the cover will embrace the sidewalls of the base and the adhesive will be located between the two, releasably sealing them together. Preferably, the adhesive will be of the type which is passive prior to the sealing of the package, such that the adhesive can be applied to the package substantially prior to the time the package might actually be used with a cassette cartridge. Such an adhesive can comprise a dry film of solvent-activatable adhesive, preferably, for reasons of cost and safety, a water-activatable adhesive. As another alternative, the adhesive could comprise a pressure-sensitive adhesive strip covered by a strip of release paper, such as is known in the art. The adhesive strip would be located in an area where the sidewalls mate, and could be applied prior to the use of the package and covered with a strip of release paper. Covered with paper, the adhesive would not interfere with the shipping and handling of the package prior to sealing. Sealing the package at the proper time would involve simply removing release paper rather than applying adhesive at that time.

As can be seen in FIGS. 1 and 2, at ends 14a and 12a, the cover and the base can comprise corresponding tab portions 32 and 34, having holes 36 and 38. The tabs having holes allow the package to be easily displayed at the point of sale by hanging it from a hook or rod placed through the holes.

Preferably, cover 14 and base 12 will comprise a transparent, thin, normally flexible plastic material. The transparency of the packaging material will allow the use of preprinted inserts for identifying and promoting the recording, rather than printing such information directly on the package. The benefits of using printed inserts have been discussed earlier under "Background of the Invention".

Frequently, thin, flexible plastic packaging material is desirable for a variety of reasons including its generally low cost, light weight for shipping and handling, and pliability which gives it resistance to cracking or breaking. However, such material has generally been unsuitable for theft-resistance cassette cartridge packaging, because typically such materials readily can be folded to a smaller size for easy concealment and theft. However, the preferred embodiment of my invention comprises precisely such a thin flexible plastic material, thus allowing the advantages of such a material to be enjoyed in a theft-resistant cassette tape point of sales package. The package of this invention remains somewhat flexible, and in fact in the open position, both the cover and the base can quite easily be deformed by simple hand pressure. However, in the closed position with the cover cooperatively mating with the base as shown in FIGS. 2 and 3, the package achieves its maximum rigidity. In the closed position, the package is still somewhat flexible, but is not easily bent or folded over to decrease its size.

Cover 14 and base 12 are preferably formed as one piece, by thermoforming a single sheet of plastic, with a portion of that plastic flexibly connecting the cover and the hinge together. The thermoforming process allows for the very inexpensive construction of the theft-resistant cassette cartridge packages of this invention.

The thermoforming process is well known in the art. Basically, this process involves vacuum-forming or molding a heated sheet of plastic material, typically a thin, flexible, easily folded plastic material, into a mold, allowing it to set, and then removing it from the mold.

In this process, a flat sheet of normally flexible plastic material typically about 10-20 mils thick, or more typically, about 15 mils thick, is supported on a frame (usually a rectangular frame) and secured along the edges. The preferred plastic material is extrusion grade polyvinyl chloride (PVC), although any other suitable plastic material can of course be used. The sheet of plastic is heated to the point where the plastic is soft and easily deformed. The frame supporting the heated plastic is lowered onto a mold. The mold is usually a female mold and is preferably of aluminum because of the ease with which a mold can be made from an aluminum material; however, molds of wood, steel, and the like can be used. The mold is provided with the configuration necessary to form the desired shape from the plastic material.

Spaced within the mold are tiny holes piercing the surface of the mold completely to allow a vacuum to be drawn from beneath the mold, through it to the heated plastic sheet. Preferably the holes are sufficiently small that their imprint will not appear on the molded plastic sheet. A vacuum from beneath the mold operates through the small holes and draws the plastic sheet toward and into the mold, forcing the sheet to conform to the mold configuration. The plastic is allowed to set for usually 20 or 30 seconds, and then is lifted off the mold. A typical mold for the present invention can be designed to provide multiple (e.g. five) cassette cartridge point of sale packages of this invention from a sufficiently large single sheet of plastic. Once the plastic conforms to the mold and has set (i.e. cooled), the five packages can be cut apart by a die-cutting device, as is known in the art.

The package 10 is designed so that it can be opened to virtually any angle up to about 360°. In substantially any open position, including the approximately closed position, one package made according to this invention can be nested with another, such that a large quantity of packages will take up relatively little space and will tend to remain together due to the nesting arrangement. This proves to be very advantageous during shipping and storage, where space is valuable and where ease of stacking can be important.

Numerous characteristics and advantages of my invention have been set forth in the foregoing detailed description. It will be understood of course, that this disclosure is, in many respects, only illustrative. Changes may be made in details, particularly in matters of shape, size, and arrangement of parts without exceeding the scope of the invention. Obviously, many modifications and variations of the present invention are possible in light of the above teachings. It is therefore understood that within the scope of the appended claims, the invention may be practiced otherwise than as is specifically described.

We claim:

1. A plastic point of sale package for a standard cassette tape cartridge comprising a cover and a base. The cover and the base both being composed of a heat deformed sheet of extrusion grade polyvinyl chloride, the sheet having a thickness in the range of 10-20 mils, the base having two recessed coplanar cavities, the cavities being compatibly dimensioned so as to securely house a standard cassette tape cartridge, the cavities being interconnected by a recessed bridge, the recessed bridge being integrally formed within the base member so as to provide stiffness to the base member, the base member further including a single, continuous, peripheral, radiused, recessed channel surrounding the perimeter of the base member so as to stiffen the base member, the base member also having sidewalls as terraced shoulders, the shoulders providing increased rigidity to the base member, the cover of the package being compatibly shaped so as to cooperatively mate with the base, thereby sealing the cassette tape cartridge within the cavity, the cover and base being permanently attached together by means of an integrally formed hinge so as to permit opening and closing the package.

* * * * *